United States Patent [19]
Brader et al.

[11] Patent Number: 5,786,875
[45] Date of Patent: Jul. 28, 1998

[54] THERMAL LIQUID CRYSTAL DISPLAY USING THERMOELECTRIC LINK

[76] Inventors: Lawrence Allen Brader, 21314-129th Ave. SE., Snohomish, Wash. 98290; Roger Guy March, 14120 NE. 181st Pl., Apt. J204, Woodinville, Wash. 98072

[21] Appl. No.: 616,644

[22] Filed: Mar. 15, 1996

[51] Int. Cl.$^6$ .................................................. G02F 1/133
[52] U.S. Cl. ......................................... 349/20; 349/21
[58] Field of Search .............................. 359/43, 44, 45; 349/20, 21

[56] References Cited

U.S. PATENT DOCUMENTS

| | | |
|---|---|---|
| 3,354,565 | 11/1967 | Emmons et al. . |
| 3,836,243 | 9/1974 | Melchior . |
| 3,897,643 | 8/1975 | Morris, Jr. et al. . |
| 3,936,817 | 2/1976 | Levy et al. . |
| 4,391,492 | 7/1983 | Lu et al. . |
| 4,922,242 | 5/1990 | Parker . |
| 5,128,616 | 7/1992 | Palmer ........................ 359/44 |
| 5,559,614 | 9/1996 | Urbish et al. ................ 359/44 |

FOREIGN PATENT DOCUMENTS

| | | | |
|---|---|---|---|
| 62-108225 | 5/1987 | Japan | ........................ 359/44 |
| 62-113128 | 5/1987 | Japan | ........................ 359/43 |
| 1-147526 | 6/1989 | Japan | ........................ 359/44 |

*Primary Examiner*—Huy Mai
*Assistant Examiner*—Walter Malinowski
*Attorney, Agent, or Firm*—Graybeal Jackson Haley LLP

[57] ABSTRACT

The present invention is a thermally addressed display and a method for manufacturing a thermally addressed display. The device uses thermoelectric elements to transition liquid crystal molecules from one optical state to another. The display can be manufactured on a flexible film and can be fabricated as either a color or monochrome display. The display can be constructed as a seven segment display, a pixel based display, or a symbolic display.

18 Claims, 1 Drawing Sheet

THERMAL LIQUID CRYSTAL DISPLAY USING THERMOELECTRIC LINK

FIELD OF THE INVENTION

The present invention relates generally to electronic displays, and more particularly to a thermally addressable liquid crystal display and a method for fabricating such.

BACKGROUND OF THE INVENTION

Liquid crystal flat panel displays have been commercially available since the early 1970's. Just as the development of the transistor brought about the demise of the vacuum tube, the flat panel display (FPD) will replace the cathode ray tube. Flat panel displays make possible applications previously impractical with CRT technology. Combining light weight, slim profile, low power consumption, and good visibility makes flat panel displays the obvious choice for portable electronics. Flat panel displays are used in portable and desk top computers, portable televisions, projection displays, video camera view finders, and numerous other information displays. Every day we see more and more industrial and consumer products using flat panel displays.

Liquid crystal is a substance that flows like a liquid but is composed of molecules that lie in a moderately orderly array. Liquid crystals retain their dual liquid and solid nature over a certain range of temperatures and pressures. At sufficiently high temperatures or low pressures, the orientational order relaxes into random molecular rotations, causing a liquid crystal to become an ordinary liquid. At sufficiently low temperatures or high pressures, molecules in a liquid crystal cease being able to easily move by each other, and the liquid crystal freezes into a ordinary solid.

The many classes of liquid crystals include nematic, cholesteric, and various smectic phases, each characterized by a different spatial arrangement of the molecules. The optical properties of a liquid crystal can often be manipulated by subjecting the liquid crystal to an electric or magnetic field which changes the orientation of its molecules.

By applying a small electric field, certain liquid crystal substances change from transparent to opaque or gain the ability to rotate polarized light. These types of liquid crystals are used to construct the flat panel displays. Other types of liquid crystals reflect different wavelengths of light depending upon the orientation of its molecules. The orientation of the molecules can be effected by temperature. These types of liquid crystals are used in thermometers that display different colors corresponding to the temperature of the substance with which the liquid crystal is in contact.

Traditional liquid crystal displays (LCDs) are fabricated as a sandwich of liquid crystal material between two plates of glass. A electrical charge is applied to the liquid crystals in order to vary the optical state of the liquid crystal. Typically, displays are arranged as a matrix of points called pixels, each of which can be turned light or dark by varying the optical state, through the application of a variable electrical charge, of the liquid crystals associated with the pixel. How the electrical charge is applied to the liquid crystal cells depends upon whether the display is an active matrix display or a passive matrix display. Both gray scale and color liquid crystal displays are based upon two primary panel technologies: passive matrix and active matrix. Passive matrix displays use strips of electrodes and multiplexing schemes to apply electrical charges to the liquid crystals for each pixel on the screen. Active matrix displays use individual transistors to place an electrical charge on the liquid crystals for each pixel on the screen.

In one prior art liquid crystal display, light emanating from an illuminating panel at the back or side of the display spreads out in waves that vibrate in all of the possible 360° of orientations. A polarizing filter in front of the light panel lets through only the light waves that are vibrating more or less horizontally. The polarizing filter is not entirely precise, this allows the display to create different hues. In a layer of liquid crystal cells, varying electrical charges are applied to some of the cells and no charge at all to other cells.

In cells to which the charge is applied, the long rod shaped molecules that make up the liquid crystal material in the cell react to the charge by twisting. The greater the charge, the more the molecules twist. With the strongest charge, the molecules at one end of the cell wind up at an angle of 90° from the orientation of the molecules at the other end of the cell. Polarized light entering the cell from the rear is twisted along the spiral paths of the molecules. In the cells to which a full charge is applied, the polarized light emerges vibrating at a 90° angle to its original orientation. Light passing through the cells that have no charge emerge unchanged. Cells which receive a partial charge twist the light to some angle between 0° and 90° depending upon the amount of charge.

In a color display, light emerging from each of the liquid crystal cells passes through one of three color filters (red, blue, or green) that are arranged close to one another. The colored beams of light pass through a second polarizing filter that is aligned to let pass only light waves that are vibrating more or less vertically. Light that passes through a liquid crystal pixel to which a full electrical charge has been applied is now oriented perfectly to pass through the second filter. Because the filter is not entirely precise, some of the light waves that pass through the cell with a partial charge, and which consequently were only partially twisted, pass through the filter while others are blocked. The light that was not twisted at all when it passed through the liquid crystal is now blocked completely.

The liquid crystal display described above utilizes a current flow through the liquid crystal material or an electrical field applied across the same material to alter the optical states of the liquid crystal material. Typically, the liquid crystal materials are optically variable between a transparent or light scattering state and, upon application or removal of a predetermined electric field, to a second optical state wherein the liquid crystal is respectively light scattering or transparent.

Another type of display uses temperature to vary the liquid crystal material from one optical state to another. In prior art devices of this type, a thermal electric element having a surface which exhibits reversible temperature as a function of the magnitude and direction of a current passing through the element is used to apply or remove heat to the liquid crystal material. This type of thermal electric element is based upon the Peltier effect in which heat is evolved or absorbed at the junction of two dissimilar metals carrying a small current, depending upon the direction of the current. In the prior art displays, the thermal electric element includes two dissimilar conductors joined in an overlapping relation over a predetermined area to form a junction. The junction is formed by overlapping a p-type semiconductive layer and an n-type semiconductive layer that is separated by an electrically conductive layer of material. A liquid crystal material is then disposed on the surface of the thermal electric element in the region of the junction. The liquid crystal material is therefore in a thermally conductive relationship with the junction and can be made to vary from one optical state to another as a function of temperature. In this manner, the optical state which the display device exhibits is a function of the direction and the magnitude of the current passing through the junction of the thermoelectric element.

These types of prior art displays suffer from many of the same problems as the more traditional liquid crystal displays. Its use of semiconductor materials built up in layers requires that it use the same complex and expensive fabrication techniques required in the construction of liquid crystal displays using an electrical field or current to change the optical state of the liquid crystal material. The photolithography techniques required to build up the layers of semiconductor material used in the thermoelectric elements also prevent the construction of a flexible display.

The previously discussed liquid crystal displays are limited by the fact that their fabrication requires expensive and complicated technology. The technology used to fabricate prior art liquid crystal displays also limits the size of the displays that can be produced. These displays are also limited because they cannot be produced on a flexible material such as a polymer film, nor can they be produced below a certain thickness.

SUMMARY OF THE INVENTION

The present invention is a thermal liquid crystal display which can be built as either a monochrome or color display and can be placed on a polyester or other flexible film. In accordance with one preferred embodiment, the thermal liquid crystal display includes a base layer of polyester film onto which conductive ink is deposited in the desired pattern to create the electronic interconnections for the display. An electrically resistive ink is then deposited across the desired electronic circuit points to form thermoelectric elements. The entire surface is then coated with white ink to form a reflective background layer. In a color display, red ink, blue ink, and green ink are deposited, through silk screening or other well known techniques, onto the surface of the reflective layer in alignment with the thermoelectric elements created on the resistive layer. The entire surface is then coated with liquid crystal material or, alternatively, liquid crystal material is silk screened in dots over the color pixels. A polyester cover film is then set over the top of the liquid crystal material.

DETAILED DESCRIPTION OF THE INVENTION

Figure 1:
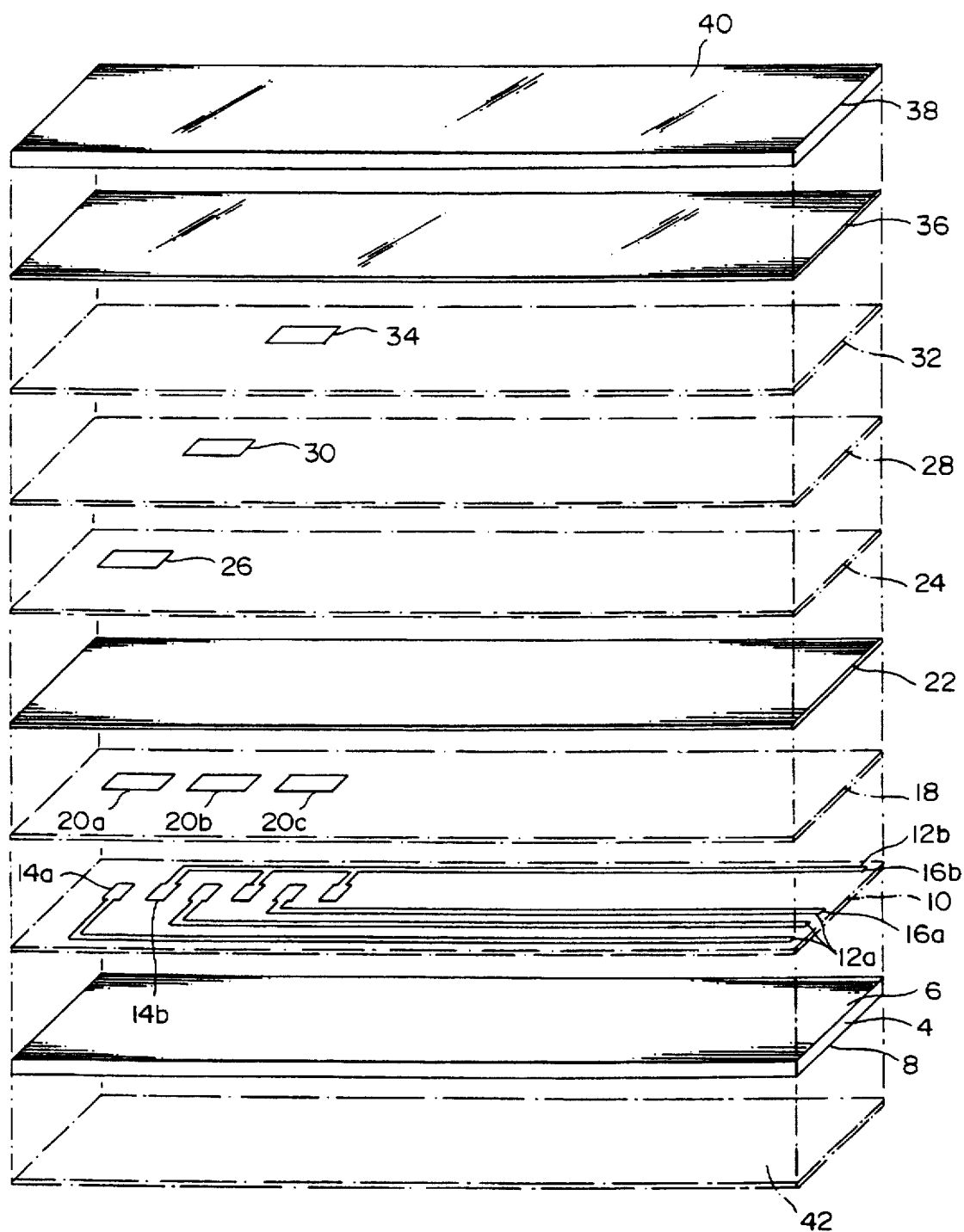
FIG. 1 illustrates an exploded diagram of a preferred embodiment of the present invention.

FIG. 1 illustrates a color thermal liquid crystal display 2. The display device 2 includes a base layer 4 having a top surface 6 and a bottom surface 8. A circuit layer 10 comprising conducting leads 12a and 12b, contact points 14a and 14b, and connecting points 16a and 16b is deposited onto the top surface 6 of base layer 4. The electrically conductive leads 12a and 12b, contact points 14a and 14b, and connecting points 16a and 16b can be formed from an electrically conductive ink containing copper, silver, gold, or another suitable conductive material. Resistive layer 18 is then formed by depositing electrically resistive ink pixels 20a, 20b, and 20c between the contact points 14a and 14b of the circuit layer 10. The electrically resistive ink pixels 20a, 20b, and 20c form thermoelectric elements which generate heat when an electrical current is passed through them. Typically the electrically resistive ink includes carbon. A coating of electrically insulative material may also be deposited onto the circuit layer 10 and resistive ink layer 18 in order to minimize the possibility of a short circuit.

A background layer 22 of white ink is then deposited onto the entire top surface 6 of the layers. A first color layer 24 is then formed by depositing first color ink pixel 26 on top of the reflective background layer 22 in alignment with electrically resistive ink pixel 20a. A second color layer 28 is formed by depositing second color ink pixel 30 on top of the reflective background layer 22 in alignment with electrically resistive ink pixel 20b. The third color layer 32 is formed by depositing a third color ink pixel 34 onto electrically resistive ink pixel 20c. While the color layers are described separately, they in fact all lie within the same plane on top of the reflective background layer and are in registration with individual electrically resistive ink pixels. The size and arrangement of the electrically resistive ink pixels 20a, 20b, and 20c, and the color pixels 26, 30, and 34 is dependent upon the intended use of the display. Color pixels 26, 30, and 34 are advantageously arranged in a standard Red Green Blue (RGB) configuration for a color display.

A light shutter layer 36 is created by depositing liquid crystal material over the entire top surface of the layers. Alternatively, the light shutter layer 36 can be formed by depositing a matrix of liquid crystal material only over the points which are in registration with the color pixels in either the first color layer 24, the second color layer 28, or the third color layer 32. Three such dotted layers of liquid crystal may be applied, each over a different color of ink so that they all lie in the same plane. In either embodiment the liquid crystal material used to form the light shutter layer 36 is thermally reactive within the temperature range of the thermoelectric elements formed by electrically resistive ink pixels 20a, 20b, and 20c.

A cover layer 38, also manufactured of polyester film, is adhered to the top of light shutter layer 36. Optionally, an infrared and/or ultraviolet protective coating 40 may be applied to the top surface of cover layer 38. Another option is the placement of a second circuit layer 42 on the bottom surface 8 of base layer 4. The circuits of this optional layer align with holes in the base layer 4 to complete connections to conductive or resistive elements on the top surface of the base layer 4.

A method for manufacturing the above described thermal liquid crystal display involves die cutting two layers of polyester film to desired size and shape. One piece of polyester film serves as the base for the circuit layer 10.

Conductive ink, typically containing silver, is silk screened in the desired pattern to create the electrical interconnections on the surface of the circuit layer 10 comprising conducting leads 12a and 12b, contact points 14a and 14b, and connecting points 16a and 16b.

After drying, the conductive ink is coated with an insulating coat of acrylic or varnish where required.

After the insulating coat has dried, electrically resistive ink is silk screened across the desired electronic circuit points, specifically the contact points 14a and 14b.

After the electrically resistive ink dries, the entire surface is coated with a reflective ink, white in the preferred embodiment. The reflective coating should be chosen to allow heat to be conducted from the thermoelectric elements to the liquid crystal material. The reflective ink is not necessary if the colored inks provide adequate reflection without the reflective background. In a monochrome display the background ink can be the monochrome.

Color pixels are then silk screened onto the reflective surface in registration with the thermoelectric elements and allowed to dry.

The entire surface is then coated with a liquid crystal matrix. Alternatively, the liquid crystal matrix can be silk screened over the individual color pixels.

A clear adhesive is then applied to the back of a polyester film cover layer and it is affixed to the top of the stack.

Though silk screening is preferred, other methods for applying inks, such as ink jet or block printing, are within the scope of the present invention.

As an alternative to the above described display which utilizes a series of colored or monochrome pixels to create images on a display it is within the scope of the present invention to build a seven segment display in which segments are hidden or revealed by controlling the thermoelectric elements associated with the segments. The display can also be constructed to hide or illuminate a predetermined symbol or phrase. In this embodiment the thermoelectric elements are deposited in a pattern matching the symbol or phrase that is to be selectively displayed.

Optionally, a transparent light conducting layer can be placed between the reflective background layer 22 and the light shutter layer 36. The color layers 24, 28, and 32 can be deposited onto reflective background layer 22 or the transparent light conducting layer. In operation, the transparent light conducting layer has light injected into it from one or more of its edges.

It is also within the scope of the present invention to construct the display without the reflective layer of white ink and instead to provide illumination from behind the display. It is also possible to manufacture the display so that it can be mounted in a window using an adhesive or prepare a surface of the film so that the display will cling in place.

It is also within the current embodiment of the present invention to use Ultraviolet (blacklight) illumination and fluorescent inks in order to brighten the display. This embodiment of the display could be UV light sourced from the front, side, or back of the display, or through the transparent layer described above.

From the foregoing teachings, it can be appreciated by one skilled in the art that a new, novel, and nonobvious thermally addressed liquid crystal display has been disclosed. It is to be understood that numerous alternatives and equivalents will be apparent to those of ordinary skill in the art, given the teachings herein, such that the present invention is not to be limited by the foregoing description but only by the appended claims.

We claim:

1. A thermally addressed liquid crystal display comprising:
   a) a circuit layer having a top and bottom surface and a perimeter and an interior, having at least two electrical contact points of opposite polarity on the interior of the top surface of the circuit layer;
   b) a layer of thermoelectric material deposited in a predetermined pattern in electrical contact with each of a pair of contact points; and
   c) a light shutter layer of thermal liquid crystal material deposited on top of said thermoelectric material layer.

2. The display of claim 1, further comprising:
   d) a color filter layer transmissively aligned with said light shutter layer.

3. The display of claim 1, further comprising:
   d) a reflective background layer deposited on top of said layer of thermoelectric material; and
   e) a color filter layer transmissively aligned with said light shutter layer.

4. The display of claim 1, wherein said circuit layer is flexible.

5. The display of claim 1, wherein said deposited thermoelectric material is thermoelectric ink.

6. A flexible thermally addressed liquid crystal display comprising:
   a) flexible circuit layer having a top and bottom surface and a perimeter and an interior, having at least two electrical contact points of opposite polarity on the interior of the top surface of the circuit layer;
   b) a flexible thermal layer including at least one selectively energizable thermoelectric element wherein said thermoelectric element is deposited onto and between said electrical contact points;
   c) a flexible control circuit coupled to at least one of said thermoelectric elements; and
   d) a flexible light shutter layer of thermal liquid crystal material in thermal contact with said thermal layer.

7. The display of claim 6, further comprising:
   e) a flexible color filter layer transmissively aligned with said light shutter layer.

8. The display of claim 6, further comprising:
   e) a flexible reflective background layer deposited on top of said layer of thermoelectric material; and
   f) a flexible color filter layer transmissively aligned with said light shutter layer.

9. The display of claim 6, wherein said deposited thermoelectric material is thermoelectric ink.

10. The display of claim 6, wherein said thermoelectric element is a resistor comprised of a single material electrically connecting a pair of electrical contact points.

11. A method for producing a thermally addressed liquid crystal display comprising the steps of:
    a) depositing thermoelectric ink across electrical contact points on an electrical circuit layer; and
    b) depositing thermal liquid crystal material in thermal contact with said thermoelectric ink.

12. The method of claim 11, wherein said depositing thermoelectric ink across electrical contact points consists of silk screening thermoelectric ink across electrical contact points.

13. A thermally addressed liquid crystal display produced by the method of claim 12.

14. The method of claim 11, further comprising the step of:
    c) depositing color filtering ink in a predetermined pattern such that it is transmissively aligned with said thermal liquid crystal material.

15. A thermally addressed liquid crystal display produced by the method of claim 14.

16. The method of claim 11, further comprising the steps of:
    c) depositing a reflective ink on top of said thermoelectric ink; and
    d) depositing color filtering ink in a predetermined pattern such that it is transmissively aligned with said thermal liquid crystal material.

17. A thermally addressed liquid crystal display produced by the method of claim 16.

18. A thermally addressed liquid crystal display produced by the method of claim 11.

* * * * *